United States Patent
Poremba et al.

(10) Patent No.: US 8,369,316 B2
(45) Date of Patent: *Feb. 5, 2013

(54) WIRELESS EMERGENCY SERVICES PROTOCOLS TRANSLATOR BETWEEN ANSI-41 AND VOIP EMERGENCY SERVICES PROTOCOLS

(75) Inventors: Todd Poremba, Seattle, WA (US); Gordon J. Hines, Kirkland, WA (US); Victor Burton, Bellevue, WA (US)

(73) Assignee: TeleCommunication Systems, Inc., Anapolis, MD (US)

( * ) Notice: Subject to any disclaimer, the term of this patent is extended or adjusted under 35 U.S.C. 154(b) by 144 days.

This patent is subject to a terminal disclaimer.

(21) Appl. No.: 12/929,953

(22) Filed: Feb. 28, 2011

(65) Prior Publication Data

US 2011/0149954 A1   Jun. 23, 2011

Related U.S. Application Data

(63) Continuation of application No. 12/453,870, filed on May 26, 2009, now Pat. No. 7,903,587.

(60) Provisional application No. 61/129,008, filed on May 30, 2008.

(51) Int. Cl.
   *H04L 12/66* (2006.01)
(52) U.S. Cl. ........ 370/352; 370/356; 370/259; 370/328; 370/389; 370/401
(58) Field of Classification Search .......... 370/352–356, 370/401, 392, 467, 328, 389
   See application file for complete search history.

(56) References Cited

U.S. PATENT DOCUMENTS

| | | |
|---|---|---|
| 4,868,570 A | 9/1989 | Davis |
| 5,712,900 A | 1/1998 | Maupin |
| 5,937,344 A | 8/1999 | Zicker |
| 6,002,936 A | 12/1999 | Roel-Ng |
| 6,108,533 A | 8/2000 | Brohoff |
| 6,134,316 A | 10/2000 | Kallioniemi |
| 6,181,939 B1 | 1/2001 | Ahvenainen |
| 6,253,074 B1 | 6/2001 | Carlsson |
| 6,275,937 B1 | 8/2001 | Hailpern |
| 6,304,635 B1 | 10/2001 | Iwami |
| 6,321,092 B1 | 11/2001 | Fitch et al. |
| 6,330,313 B1 | 12/2001 | Hunt |
| 6,360,102 B1 | 3/2002 | Havinis |
| 6,427,001 B1 | 7/2002 | Contractor |

(Continued)

FOREIGN PATENT DOCUMENTS

| WO | WO01/45342 | 6/2001 |
|---|---|---|
| WO | WO2004/025941 | 3/2004 |

OTHER PUBLICATIONS

International Search Report received in PCT/US2012/00208 dated Jul. 6, 2012.

(Continued)

*Primary Examiner* — Asad Nawaz
*Assistant Examiner* — Khaled Kassim
(74) *Attorney, Agent, or Firm* — William H. Bollman

(57) ABSTRACT

A protocol converter or translator between ANSI-41 ORREQs and VoIP V2 messaging. The protocol converter may alternatively (or also) provide conversion between GMS MAP and VoIP V2 messaging. Interaction of VSPs with a Mobile Positioning Center (MPC) or a Gateway Mobile Location Center (GMLC) is permitted, as is interaction of wireless carriers with a Voice Positioning Center (VPC). In this way existing GMLCs or MPCs may be used to service VoIP 9-1-1 calls. Moreover, operators of Voice Positioning Centers (VPCs) who implement wireless offerings can re-use their existing VPCs to service wireless 9-1-1 calls.

8 Claims, 4 Drawing Sheets

U.S. PATENT DOCUMENTS

| | | |
|---|---|---|
| 6,429,808 B1 | 8/2002 | King |
| 6,526,026 B1 | 2/2003 | Menon |
| 6,529,500 B1 | 3/2003 | Pandharipande |
| 6,539,232 B2 | 3/2003 | Hendrey |
| 6,587,691 B1 | 7/2003 | Granstam |
| 6,687,504 B1 | 2/2004 | Raith |
| 6,694,351 B1 | 2/2004 | Shaffer |
| 6,731,940 B1 | 5/2004 | Nagendran |
| 6,744,858 B1 | 6/2004 | Ryan |
| 6,757,545 B2 | 6/2004 | Nowak |
| 6,775,267 B1 | 8/2004 | Kung |
| 6,775,534 B2 | 8/2004 | Lindgren |
| 6,795,444 B1 * | 9/2004 | Vo et al. ............ 370/401 |
| 6,813,501 B2 | 11/2004 | Kinnunen |
| 6,847,618 B2 | 1/2005 | Laursen |
| 6,876,734 B1 | 4/2005 | Summer |
| 6,882,850 B2 | 4/2005 | McConnell |
| 6,898,274 B1 | 5/2005 | Galt |
| 6,940,826 B1 | 9/2005 | Simard |
| 6,963,748 B2 | 11/2005 | Chithambaram |
| 6,968,044 B2 | 11/2005 | Beason |
| 6,985,747 B2 | 1/2006 | Chithambaram |
| 7,031,724 B2 | 4/2006 | Ross |
| 7,106,717 B2 | 9/2006 | Rousseau |
| 7,136,466 B1 | 11/2006 | Gao |
| 7,174,153 B2 | 2/2007 | Ehlers |
| 7,177,397 B2 | 2/2007 | McCalmont |
| 7,177,398 B2 | 2/2007 | Meer |
| 7,177,399 B2 | 2/2007 | Dawson |
| 7,200,380 B2 | 4/2007 | Havlark |
| 7,245,900 B1 | 7/2007 | Lamb |
| 7,245,910 B2 | 7/2007 | Osmo |
| 7,246,187 B1 | 7/2007 | Erza |
| 7,260,186 B2 | 8/2007 | Zhu |
| 7,269,428 B1 | 9/2007 | Wallenius |
| 7,302,582 B2 | 11/2007 | Snapp |
| 7,321,773 B2 | 1/2008 | Hines |
| 7,330,899 B2 | 2/2008 | Wong |
| 7,369,530 B2 | 5/2008 | Keagy |
| 7,382,773 B2 | 6/2008 | Schoeneberger |
| 7,392,240 B2 | 6/2008 | Scriffignano |
| 7,394,896 B2 | 7/2008 | Norton |
| 7,428,571 B2 | 9/2008 | Ichimura |
| 7,436,769 B2 | 10/2008 | Loader |
| 7,436,785 B1 | 10/2008 | McMullen |
| 7,440,442 B2 | 10/2008 | Grabelsky |
| 7,450,951 B2 | 11/2008 | Vimpari |
| 7,453,990 B2 | 11/2008 | Welenson |
| 7,522,182 B2 | 4/2009 | Bang |
| 7,573,982 B2 | 8/2009 | Breen |
| 7,602,886 B1 | 10/2009 | Beech |
| 7,623,447 B1 | 11/2009 | Faccin |
| 7,626,951 B2 | 12/2009 | Croy |
| 7,627,331 B2 | 12/2009 | Winterbottom |
| 7,711,094 B1 | 5/2010 | Olshansky |
| 7,764,961 B2 | 7/2010 | Zhu |
| 7,787,611 B1 | 8/2010 | Kotelly |
| 7,881,233 B2 | 2/2011 | Bieselin |
| 7,937,066 B2 | 5/2011 | Kaltsukis |
| 7,937,067 B2 | 5/2011 | Maier |
| 2002/0055924 A1 | 5/2002 | Liming |
| 2002/0085538 A1 | 7/2002 | Leung |
| 2002/0086676 A1 | 7/2002 | Hendry |
| 2002/0099802 A1 | 7/2002 | Marsh |
| 2002/0102996 A1 | 8/2002 | Jenkins |
| 2002/0118650 A1 | 8/2002 | Jagadeesan |
| 2002/0123327 A1 | 9/2002 | Vataja |
| 2002/0123354 A1 | 9/2002 | Nowak |
| 2002/0126656 A1 | 9/2002 | Park |
| 2002/0147023 A1 | 10/2002 | Sawada |
| 2002/0154221 A1 | 10/2002 | Ishimaru |
| 2002/0164998 A1 | 11/2002 | Younis |
| 2002/0173317 A1 | 11/2002 | Nykanen |
| 2002/0188680 A1 | 12/2002 | McCormick |
| 2003/0012148 A1 | 1/2003 | Peters |
| 2003/0026245 A1 | 2/2003 | Ejzak |
| 2003/0044654 A1 | 3/2003 | Holt |
| 2003/0081752 A1 | 5/2003 | Trandal |
| 2003/0086539 A1 | 5/2003 | McCalmont |
| 2003/0108176 A1 | 6/2003 | Kung |
| 2003/0109245 A1 | 6/2003 | McCalmont |
| 2003/0115261 A1 | 6/2003 | Mohammed |
| 2003/0118160 A1 | 6/2003 | Holt |
| 2003/0119521 A1 | 6/2003 | Tipnis |
| 2003/0119528 A1 | 6/2003 | Pew |
| 2003/0125021 A1 | 7/2003 | Tell |
| 2003/0135493 A1 | 7/2003 | Phelan |
| 2003/0186709 A1 | 10/2003 | Rhodes |
| 2003/0201931 A1 | 10/2003 | Durst |
| 2003/0222901 A1 | 12/2003 | Houck |
| 2004/0032485 A1 | 2/2004 | Stephens |
| 2004/0041729 A1 | 3/2004 | Rowitch |
| 2004/0043775 A1 | 3/2004 | Kennedy |
| 2004/0064500 A1 | 4/2004 | Kolar |
| 2004/0076277 A1 | 4/2004 | Kuusinen |
| 2004/0078694 A1 | 4/2004 | Lester |
| 2004/0107143 A1 | 6/2004 | Niemi |
| 2004/0132465 A1 | 7/2004 | Mattila |
| 2004/0157175 A1 | 8/2004 | Matsumoto |
| 2004/0176123 A1 | 9/2004 | Chin |
| 2004/0181689 A1 | 9/2004 | Kiyoto |
| 2004/0190497 A1 | 9/2004 | Knox |
| 2004/0198386 A1 | 10/2004 | Dupray |
| 2004/0203919 A1 | 10/2004 | Ross |
| 2004/0204847 A1 | 10/2004 | Yanai |
| 2004/0225878 A1 | 11/2004 | Costa-Requena |
| 2005/0039135 A1 | 2/2005 | Othmer |
| 2005/0053209 A1 | 3/2005 | D'Evelyn |
| 2005/0063519 A1 | 3/2005 | James |
| 2005/0074107 A1 | 4/2005 | Renner |
| 2005/0078612 A1 | 4/2005 | Lang |
| 2005/0083911 A1 | 4/2005 | Grabelsky |
| 2005/0083923 A1 | 4/2005 | Kimata |
| 2005/0101335 A1 | 5/2005 | Kelly |
| 2005/0107673 A1 | 5/2005 | Ball |
| 2005/0135569 A1 | 6/2005 | Dickinson |
| 2005/0136885 A1 | 6/2005 | Kaltsukis |
| 2005/0148351 A1 | 7/2005 | Reding |
| 2005/0148353 A1 | 7/2005 | Hicks |
| 2005/0169248 A1 | 8/2005 | Truesdale |
| 2005/0174991 A1 | 8/2005 | Keagy |
| 2005/0181805 A1 | 8/2005 | Gallagher |
| 2005/0186948 A1 | 8/2005 | Gallagher |
| 2005/0188078 A1 | 8/2005 | Kotzin |
| 2005/0195954 A1 | 9/2005 | Klein |
| 2005/0201529 A1 | 9/2005 | Nelson |
| 2005/0213537 A1 | 9/2005 | Ingimundarson |
| 2005/0238156 A1 | 10/2005 | Turner |
| 2005/0239458 A1 | 10/2005 | Hurtta |
| 2005/0265318 A1 | 12/2005 | Khartabil |
| 2005/0271051 A1 | 12/2005 | Holloway |
| 2005/0272424 A1 | 12/2005 | Gallagher |
| 2005/0272449 A1 | 12/2005 | Gallagher |
| 2005/0282518 A1 | 12/2005 | D'Evlyn |
| 2005/0287979 A1 | 12/2005 | Rollender |
| 2005/0289097 A1 | 12/2005 | Trossen |
| 2006/0008065 A1 | 1/2006 | Longman |
| 2006/0010200 A1 | 1/2006 | Mousseau |
| 2006/0023747 A1 | 2/2006 | Koren |
| 2006/0026288 A1 | 2/2006 | Acharya |
| 2006/0068753 A1 | 3/2006 | Karpen |
| 2006/0072729 A1 | 4/2006 | Lee |
| 2006/0073812 A1 | 4/2006 | Punaganti |
| 2006/0077911 A1 | 4/2006 | Shaffer |
| 2006/0079236 A1 | 4/2006 | Del Pino |
| 2006/0088152 A1 | 4/2006 | Green |
| 2006/0104306 A1 | 5/2006 | Adamczyk |
| 2006/0120517 A1 | 6/2006 | Moon |
| 2006/0135177 A1 | 6/2006 | Winterbottom |
| 2006/0154665 A1 | 7/2006 | Svensson |
| 2006/0184617 A1 | 8/2006 | Nicholas |
| 2006/0188083 A1 | 8/2006 | Breen |
| 2006/0189303 A1 | 8/2006 | Rollender |
| 2006/0205383 A1 | 9/2006 | Rollender |
| 2006/0236258 A1 | 10/2006 | Othmer |
| 2006/0239205 A1 | 10/2006 | Warren |
| 2006/0250987 A1 | 11/2006 | White et al. |

| | | |
|---|---|---|
| 2006/0258380 A1 | 11/2006 | Liebowitz |
| 2006/0281437 A1 | 12/2006 | Cook |
| 2006/0293024 A1 | 12/2006 | Benco |
| 2006/0293066 A1 | 12/2006 | Edge |
| 2007/0003024 A1 | 1/2007 | Olivier |
| 2007/0008885 A1 | 1/2007 | Bonner |
| 2007/0022011 A1 | 1/2007 | Altberg |
| 2007/0027997 A1 | 2/2007 | Polk |
| 2007/0036139 A1 | 2/2007 | Patel |
| 2007/0041513 A1 | 2/2007 | Gende |
| 2007/0049288 A1 | 3/2007 | Lamprecht |
| 2007/0060097 A1 | 3/2007 | Edge |
| 2007/0070980 A1 | 3/2007 | Phelps |
| 2007/0072553 A1 | 3/2007 | Barbera |
| 2007/0081635 A1 | 4/2007 | Croak |
| 2007/0121601 A1 | 5/2007 | Kikinis |
| 2007/0160036 A1 | 7/2007 | Smith |
| 2007/0162228 A1 | 7/2007 | Mitchell |
| 2007/0182631 A1 | 8/2007 | Berlinsky |
| 2007/0201623 A1 | 8/2007 | Hines |
| 2007/0202844 A1 | 8/2007 | Wilson |
| 2007/0206568 A1* | 9/2007 | Silver et al. .................... 370/352 |
| 2007/0206580 A1* | 9/2007 | Silver et al. .................... 370/356 |
| 2007/0206613 A1 | 9/2007 | Silver |
| 2007/0206735 A1* | 9/2007 | Silver et al. ................. 379/88.19 |
| 2007/0238448 A1 | 10/2007 | Gallagher |
| 2007/0242660 A1 | 10/2007 | Xu |
| 2007/0263610 A1 | 11/2007 | Mitchell |
| 2008/0032703 A1 | 2/2008 | Krumm |
| 2008/0037715 A1 | 2/2008 | Prozeniuk |
| 2008/0058003 A1* | 3/2008 | Rydnell et al. ............. 455/552.1 |
| 2008/0063153 A1 | 3/2008 | Krivorot |
| 2008/0065775 A1 | 3/2008 | Polk |
| 2008/0117859 A1 | 5/2008 | Shahidi |
| 2008/0186164 A1 | 8/2008 | Emigh |
| 2008/0228926 A1 | 9/2008 | Shiratzky |
| 2008/0235511 A1 | 9/2008 | O'Brien |
| 2008/0253535 A1 | 10/2008 | Sherry |
| 2008/0267172 A1 | 10/2008 | Hines |
| 2008/0273670 A1 | 11/2008 | Dickinson |
| 2009/0094270 A1 | 4/2009 | Alirez |
| 2009/0129396 A1 | 5/2009 | Bakker |
| 2009/0224931 A1 | 9/2009 | Dietz |
| 2009/0237210 A1 | 9/2009 | Ciesla |
| 2009/0284348 A1 | 11/2009 | Pfeffer |
| 2009/0298488 A1 | 12/2009 | Snapp |
| 2010/0003954 A1 | 1/2010 | Greene |
| 2010/0125892 A1 | 5/2010 | Tanizawa |
| 2010/0142386 A1 | 6/2010 | Snapp |
| 2010/0272242 A1 | 10/2010 | Croy |
| 2011/0113060 A1 | 5/2011 | Martini |
| 2011/0131414 A1 | 6/2011 | Cheng |
| 2011/0149953 A1 | 6/2011 | Helgeson |
| 2011/0165861 A1 | 7/2011 | Wilson |

OTHER PUBLICATIONS

Yilin Ahao, Efficient and reliable date transmission for cellular and GPS based mayday systems, Nov. 1997, IEEE, IEEE Conference on Intelligent Transportation System, 1997. ITSC 97, 555-559.
International Search Report in PCT/US/2010/01938 dated Sep. 30, 2010.
International Search Report in PCT/US/2009/002752 dated Jul. 6, 2009.
Intrado MSAG Prep for E911 Program and Documentation. Intrado Inc., Longmont, CO. Sep. 14, 2006. Accessed: Nov. 8, 2011. Idaho PSAP Standards Committee. Idaho Emergency Communications Commission,http://idahodispatch.com/index.php?option=com_documan&task=doc_download&gid=3&Itemid=7.
International Search Report received in PCT/US2011/001990 dated Apr. 24, 2012.

* cited by examiner

US 8,369,316 B2

WIRELESS EMERGENCY SERVICES PROTOCOLS TRANSLATOR BETWEEN ANSI-41 AND VOIP EMERGENCY SERVICES PROTOCOLS

This application is a continuation of U.S. application Ser. No. 12/453,870 entitled "WIRELESS EMERGENCY SERVICES PROTOCOLS TRANSLATOR BETWEEN ANSI-41 AND VoIP EMERGENCY SERVICES PROTOCOLS", to Poremba et al., filed May 26, 2009 now U.S. Pat. No. 7,903,587; which claims priority from U.S. Provisional Application No. 61/129,008 entitled "WIRELESS EMERGENCY SERVICES PROTOCOLS TRANSLATED BACK AND FORTH TO VoIP EMERGENCY SERVICES PROTOCOLS", to Poremba et al., filed May 30, 2008, the entirety of both of which are explicitly incorporated herein by reference.

BACKGROUND OF THE INVENTION

1. Field of the Invention

This invention relates generally to wireless telecommunications. More particularly, it relates to wireless telecommunication protocol conversion to Voice Over Internet Protocol (VoIP) protocol and vice versa. Specifically, ANSI-41 J-STD-036 E3 interface to VoIP NENA 08-001 V2 interface and vice versa. As well as, GSM J-STD-036 Lg/Lg+ interface to VoIP NENA 08-001 V2 interface and vice versa.

2. Background of the Related Art

Voice Over Internet Protocol (VoIP) is a technology that has been developed as an alternative packet-based telephony technology to the conventional switched telephony service (e.g. PSTN). VoIP takes advantage of high speed Internet data networks, and is able to provide low cost telephony services to end users. VoIP technology emulates a phone call, but instead of using a circuit based switched system such as the telephone network, utilizes packetized data transmission techniques most notably implemented in the Internet.

VoIP phone calls are routed to a VoIP voice gateway, from which they are passed on to their destination VoIP device. Conventional VoIP voice gateways (i.e., soft switches) are typically located in only a few places across the country. A soft switch is a programmable network switch that can process the signaling for all types of packet protocols. Also known as a 'media gateway controller,' 'call agent,' or 'call server,' such devices are used by carriers that support converged communications services by integrating signaling system No. 7 (SS7) type switched telephone signaling with packet networks. Softswitches can support, e.g., IP, DSL, ATM and frame relay.

Because VoIP is Internet Protocol (IP) based, call related information such as CallerID type services may not be available or accurate. A location of a given VoIP device may be statically provisioned to be at a given geographic location, or queried from a home location register (HLR) in a mobile system.

911 is a phone number widely recognized as an emergency phone number that is routed to emergency dispatch personnel and used to determine a location of a caller. Enhanced 911 (E911) is defined by the transmission of callback number and location information to the relevant public safety answering point (PSAP). A PSAP is the endpoint of an emergency services call. PSAPs are responsible for answering emergency services calls. E911 may be implemented for landline and/or mobile devices. Some Public Safety Access Points (PSAPs) are not enhanced, and thus do not receive the callback or location information from any phone, landline or mobile.

The problem is not necessarily solved with the use of a centralized emergency call center. In such case, when a VoIP customer places an emergency call such as an E911 call, the call may be routed to an emergency call center that is very far away, and in some instances half-way across the world to reach the centralized emergency call center. The VoIP E911 call must then be transferred to the relevant 911 center (public safety access point (PSAP)). However, this transfer must take place over the Public Switched Telephone Network (PSTN) because such transfer cannot conventionally be gained to the PSAP's existing Enhanced 911 (E911) dedicated network where location and callback number of the originating 911 caller are provided. Moreover, note that even the call related information (e.g., CallerID) provided with the call would relate to the identity and location of the centralized call center—not to the callback number and certainly not the location of the customer originally dialing 911.

An ANSI-41 J-STD-036 E3 ("E3") interface is a time division multiplex (TDM) format that operates at 34.368 Mbps, and supports both Physical Layer Conversion Protocol (PLCP) and direct cell mapping.

A voice over Internet Protocol (VoIP) NENA 08-001 V2 ("V2") interface is used to request emergency call routing information when the call server/routing proxy/redirect server is a separate element from a VoIP voice over Internet Protocol (VoIP) positioning center (VPC).

Session Internet Protocol (SIP) to ISDN User Part (ISUP) conversion, and ISUP to SIP conversion is somewhat common in the market. But currently, an E3 interface interfaces only with a mobile positioning center (MPC). Similarly, an Lg/Lg+ interface interfaces only with Gateway Mobile Location Centers (GMLCs), and V2 interfaces only with VoIP Positioning Centers (VPCs).

SUMMARY OF THE INVENTION

In accordance with the principles of the present invention, a method and apparatus to translate emergency services protocol call setup information from VoIP V2 to ANSI-41 ORREQ comprises receiving VoIP V2 signaling from a Voice Service Provider (VSP). A call back number (CBN) is inserted into both a mobile directory number (MDN) field and an emergency service routing digits (ESRD) field of an ANSI-41 ORREQ. An emergency service routing key (ESRK) and, if needed, digits are inserted to determine a selective router and/or trunk, into up to 20 digits of a VoIP V2 message. Use of the digits received in the VoIP V2 message permit setup of an emergency services call over Session Initiation Protocol (SIP) using a wireless ESRK.

Apparatus and a method to translate emergency services protocol call setup information from VoIP V2 to GSM MAP SLR in accordance with another aspect of the invention comprises receiving VoIP V2 signaling from a Voice Service Provider (VSP). A call back number (CBN) is inserted into both an International Mobile Subscriber Identity (IMSI) field and an na-ESRD field of a GSM MAP SLR. An emergency service routing key (ESRK) is inserted and, if needed, digits are inserted to determine a selective router and/or trunk, into up to 20 digits of a VoIP V2 message. Use of the digits received in the VoIP V2 message permit setup of an emergency services call over Session Initiation Protocol (SIP) using a wireless ESRK.

Apparatus and a method to translate emergency services protocol call setup information from ANSI-41 ORREQ to VoIP V2 in accordance with yet another aspect of the invention comprises receiving an ANSI-41 ORREQ containing a call back number (CBN) and emergency service routing digits (ESRD) from a mobile servicing center (MSC). The CBN is converted to a VoIP V2 request. The VoIP V2 request is sent to a voice positioning center (VPC). The VoIP V2 request including an emergency service query key (ESQK) and an emergency service routing number (ESRN) inserted therein in a plurality of designated fields, is returned by a voice positioning center (VPC). Use of the ORREQ permits setup of an emergency services call over ISDN User Part (ISUP) or Multi-Frequency (MF) signaling.

Apparatus and a method to translate emergency services protocol call setup information from GSM MAP SLR to VoIP V2 in accordance with still another aspect of the invention comprises receiving a GSM MAP SLR containing a call back number (CBN) and emergency service routing digits (ESRD) from a mobile servicing center (MSC). The CBN and ESRD are converted to a VoIP V2 request. The VoIP V2 request is sent to a voice positioning center (VPC). The VoIP V2 request including an emergency service query key (ESQK) and an emergency service routing number (ESRN) is returned by a voice positioning center (VPC). The VoIP V2 request is converted to an SLR with an na-ESRK with the ESQK and a last 7-digits of the ESRN. Use of the SLR permits setup of an emergency services call over ISDN User Part (ISUP) or Multi-Frequency (MF) signaling.

BRIEF DESCRIPTION OF THE DRAWINGS

Features and advantages of the present invention will become apparent to those skilled in the art from the following description with reference to the drawings.

DETAILED DESCRIPTION OF ILLUSTRATIVE EMBODIMENTS

The present inventors have appreciated that wireless carriers may soon desire the ability to use current, IS41-based wireless telecommunications protocols to request Voice Over Internet Protocol (VoIP) call routing information. They also have appreciated that VoIP Service Providers may soon desire the ability to use current VoIP protocols to request IS41-based wireless call routing information. But IS41 and Voice Over Internet Protocol (VoIP) are disparate protocols, and thus Signaling System No. 7 (SS7) nodes (IS41-based) cannot signal to Voice Positioning Centers (VPCs). Similarly, VoIP nodes cannot signal to Mobile Positioning Centers (MPCs) or Gateway Mobile Location Centers (GMLCs).

The present invention provides a protocol converter (or alternatively referred to as a translator) between ANSI-41 ORREQs and VoIP V2 messaging. The invention also provides protocol conversion (or alternatively translation) between GMS MAP and VoIP V2 messaging.

Figure 1:
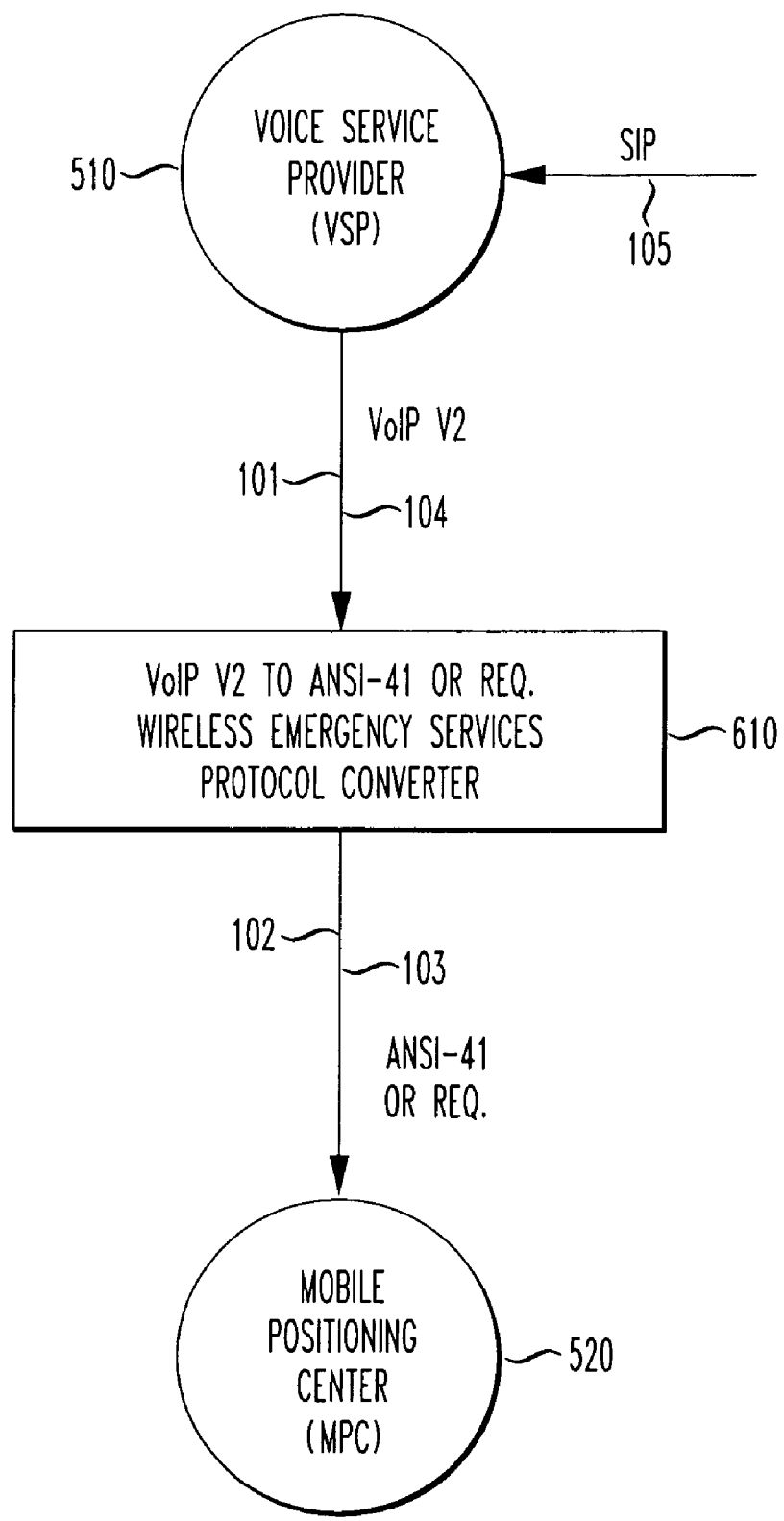
FIG. 1 shows conversion of Voice Over Internet Protocool (VoIP) emergency call set up to wireless emergency call set up, with VoIP V2 converted to ANSI-41 ORREQs, in accordance with the principles of the present invention.

FIG. 1 shows conversion of Voice Over Internet Protocool (VoIP) emergency call set up to wireless emergency call set up, with VoIP V2 converted to ANSI-41 ORREQs, in accordance with the principles of the present invention.

In particular, as shown in FIG. 1, emergency services protocols are translated from those of a voice service provider (VSP) 510 to those of a mobile positioning center (MPC) 520, by a VoIP V2 to ANSI-41 ORREQ Wireless Emergency Services Protocol Converter 610.

The VoIP V2 to ANSI-41 ORREQ Wireless Emergency Services Protocol Converter 610 functions as follows:

In step 101 of FIG. 1, the voice service provider (VSD) 510 signals VoIP V2 to the VoIP V2 to ANSI-41 ORREQ Wireless Emergency Services Protocol Converter 610.

In step 102, the VoIP V2 to ANSI-41 ORREQ Wireless Emergency Services Protocol Converter 610 puts the call back number (CBN) into an ANSI-41 ORREQ, with the call back number (CBN) preferably in both the mobile directory number (MDN) field and the emergency services routing digits (ESRD) field of the ORREQ.

In step 103, the mobile positioning center (MPC) 520 treats the mobile directory number (MDN) as the emergency services routing digits (ESRD), and the ESRD determines an ESRK (and possibly digits to select the selective router or the trunk group) based on the subscribers provisioned address, similar to how wireless calls route based on the location of a cell tower.

In step 104, the VoIP V2 to ANSI-41 ORREQ Wireless Emergency Services Protocol Converter 610 puts the ESRK and, if needed, the digits to determine the selective router and/or trunk, into a VoIP V2 message containing up to 20 digits in a preferred embodiment.

In step 105, the voice service provider (VSP) 510 uses the digits received in the VoIP V2 message to set up the call over Session Initiation Protocol (SIP) using a wireless emergency services routing key (ESRK).

Figure 2:
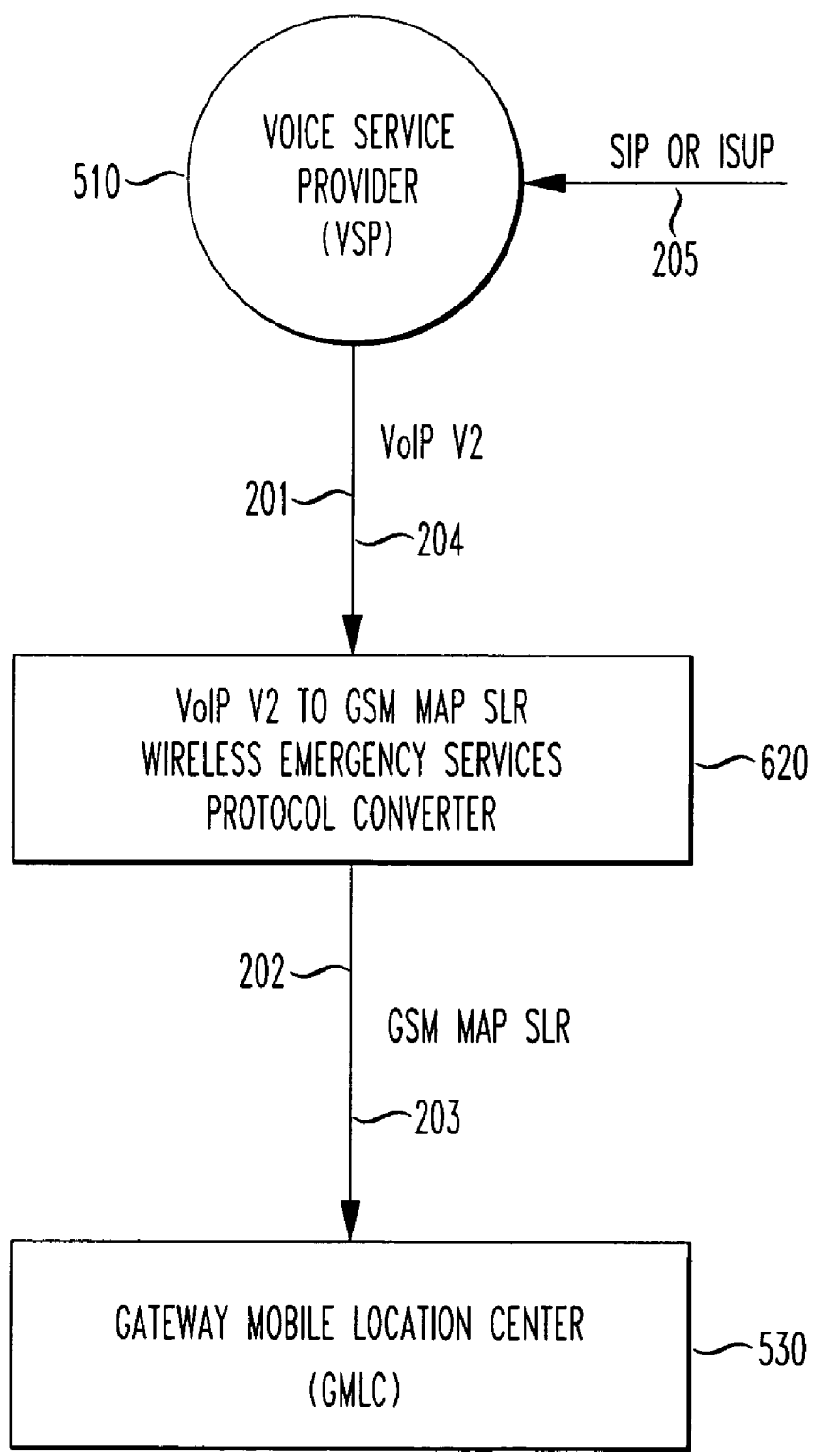
FIG. 2 shows conversion of Voice Over Internet Protocol (VoIP) emergency call set up to wireless emergency call set up, with VoIP V2 converted to GSM MAP SLRs, in accordance with the principles of the present invention.

FIG. 2 shows conversion of Voice Over Internet Protocol (VoIP) emergency call set up to wireless emergency call set up, with VoIP V2 converted to GSM MAP SLRs, in accordance with the principles of the present invention.

In particular, as shown in FIG. 2, emergency services protocols are translated from those of a voice service provider (VSP) 510 to those of a Gateway Mobile Location Center (GMLC) 530, by a VoIP V2 to GSM MAP SLR Wireless Emergency Services Protocol Converter 620.

The VoIP V2 to GSM MAP SLR Wireless Emergency Services Protocol Converter 620 functions as follows:

In step 201 shown in FIG. 2, the Voice Service Provider (VSP) 510 signals VoIP V2 to the VoIP V2 to GSM MAP SLR Wireless Emergency Services Protocol Converter 620.

In step 202, the VoIP V2 to GSM MAP SLR Wireless Emergency Services Protocol Converter 620 puts the call back number (CBN) into a GSM MAP SLR with the call back number (CBN) preferably inserted into both the International Mobile Subscriber Identity (IMSI) field and the na-ESRD field, and it sets the na-ESRK flag.

In step 203, the Gateway Mobile Location Center (GMLC) 530 treats the call back number (CBN) as ESRD, and the ESRD determines an ESRK (and possibly digits to select the selective router or the trunk group) based on the subscribers provisioned address, similar to how wireless calls route based on the location of a cell tower. The return SLR contains 17 digits: the 10 digit ESRK and up to 7 digits to determine the trunk group.

In accordance with the embodiment, it is also possible that the second 7 digits be used to represent a 10 digit number with the same NPA as the ESRK. It is preferable that the SLR na-ESRK may only contain 18 digits.

In step 204, the VoIP V2 to GSM MAP SLR Wireless Emergency Services Protocol Converter 620 puts the ESRK and, if needed, the digits to determine the selective router and/or trunk, into a VoIP V2 message containing up to 20 digits.

In step 205, the Voice Service Provider (VSP) 510 uses the digits received over VoIP V2 to set up the call over Session Initiation Protocol (SIP) using a wireless ESRK.

Figure 3:
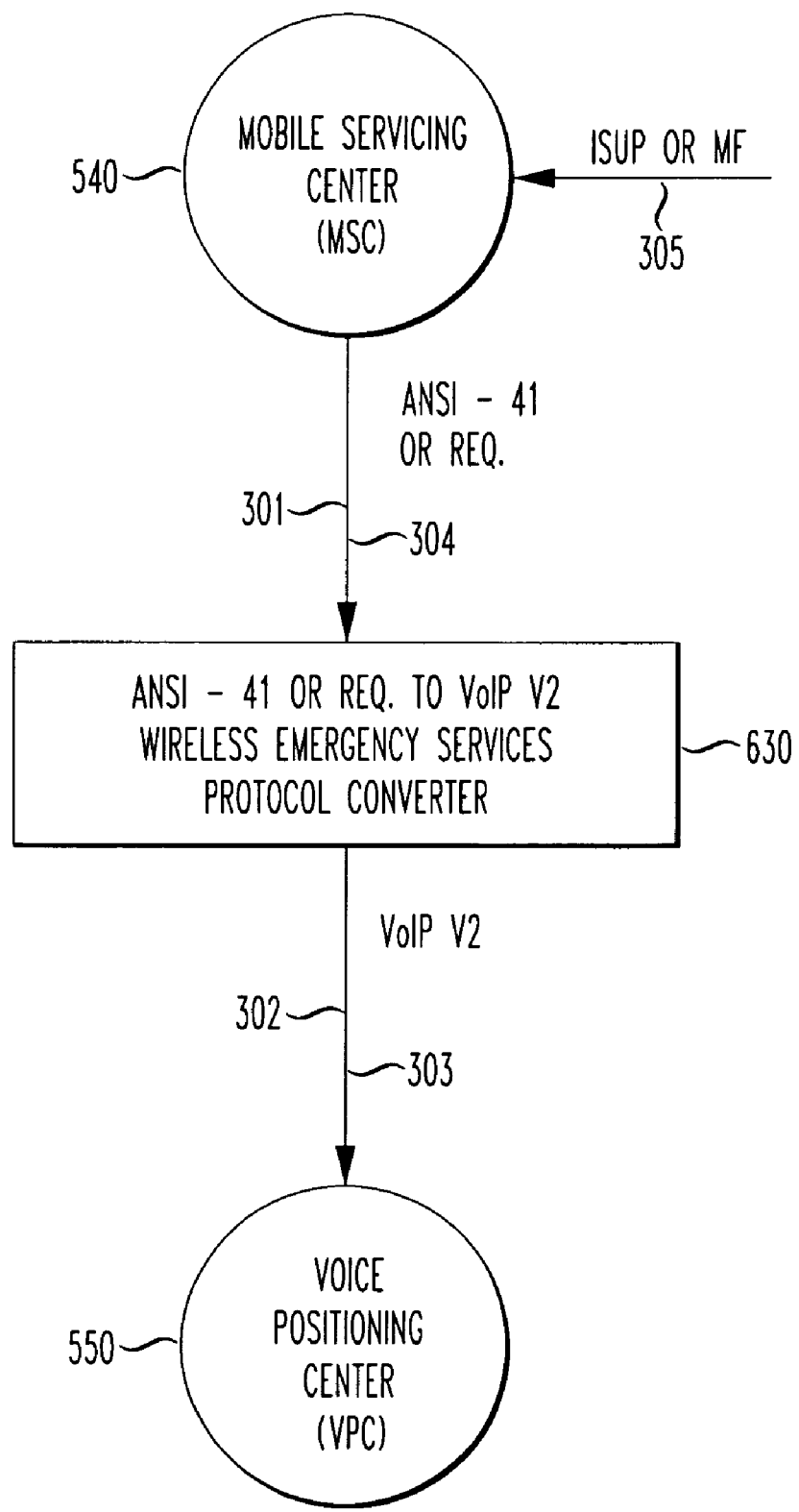
FIG. 3 shows conversion of wireless emergency call set up to Voice Over Internet Protocol (VoIP) emergency call set up, with ANSI-41 ORREQs being converted to VoIP V2, in accordance with the principles of the present invention.

FIG. 3 shows conversion of wireless emergency call set up to Voice Over Internet Protocol (VoIP) emergency call set up, with ANSI-41 ORREQs being converted to VoIP V2, in accordance with the principles of the present invention.

In particular, as shown in FIG. 3, emergency services protocols are translated back from those of a mobile servicing center (MSC) 540 to those of a Voice Positioning Center (VPC) 550, by an ANSI-41 ORREQ to VoIP V2 Wireless Emergency Services Protocol Converter 630.

The ANSI-41 ORREQ to VoIP V2 Wireless Emergency Services Protocol Converter 630 functions as follows:

In step 301 of FIG. 3, for ANSI-41 signaling, the ORREQ sent by the Mobile Servicing Center (MSC) 540 preferably contains the call back number (CBN) and the Emergency Services Routing Digits (ESRD).

In step 302, the ANSI-41 ORREQ to VoIP V2 Wireless Emergency Services Protocol Converter 630 receives the ORREQ request with the call back number (CBN) and Emergency Services Routing Digits (ESRD), converts it to a VoIP V2 request, and sends the VoIP V2 request to the Voice Positioning Center (VPC) 550.

In step 303, the Voice Positioning Center (VPC) 550 is configured to return an Emergency Service Query Key (ESQK) and Emergency Service Routing Number (ESRN).

In step 304, the ANSI-41 ORREQ to VoIP V2 Wireless Emergency Services Protocol Converter 630 receives the VoIP V2 request and converts it to an ORREQ with the Emergency Service Routing Number (ESRN) and Emergency Service Query Key (ESQK) into designated fields. Exemplary designated fields used for insertion of the combination of the ESRN and ESQK may be any combination of the DialedDigits field, the Mobile Directory Number (MDN) field, the BillingDigits field, and/or the GenericDigits field.

In step 305, the Mobile Servicing Center (MSC) 540 receives the ORREQ and sets up the call appropriately over ISDN User Part (ISUP) or Multi-Frequency (MF) signaling.

Figure 4:
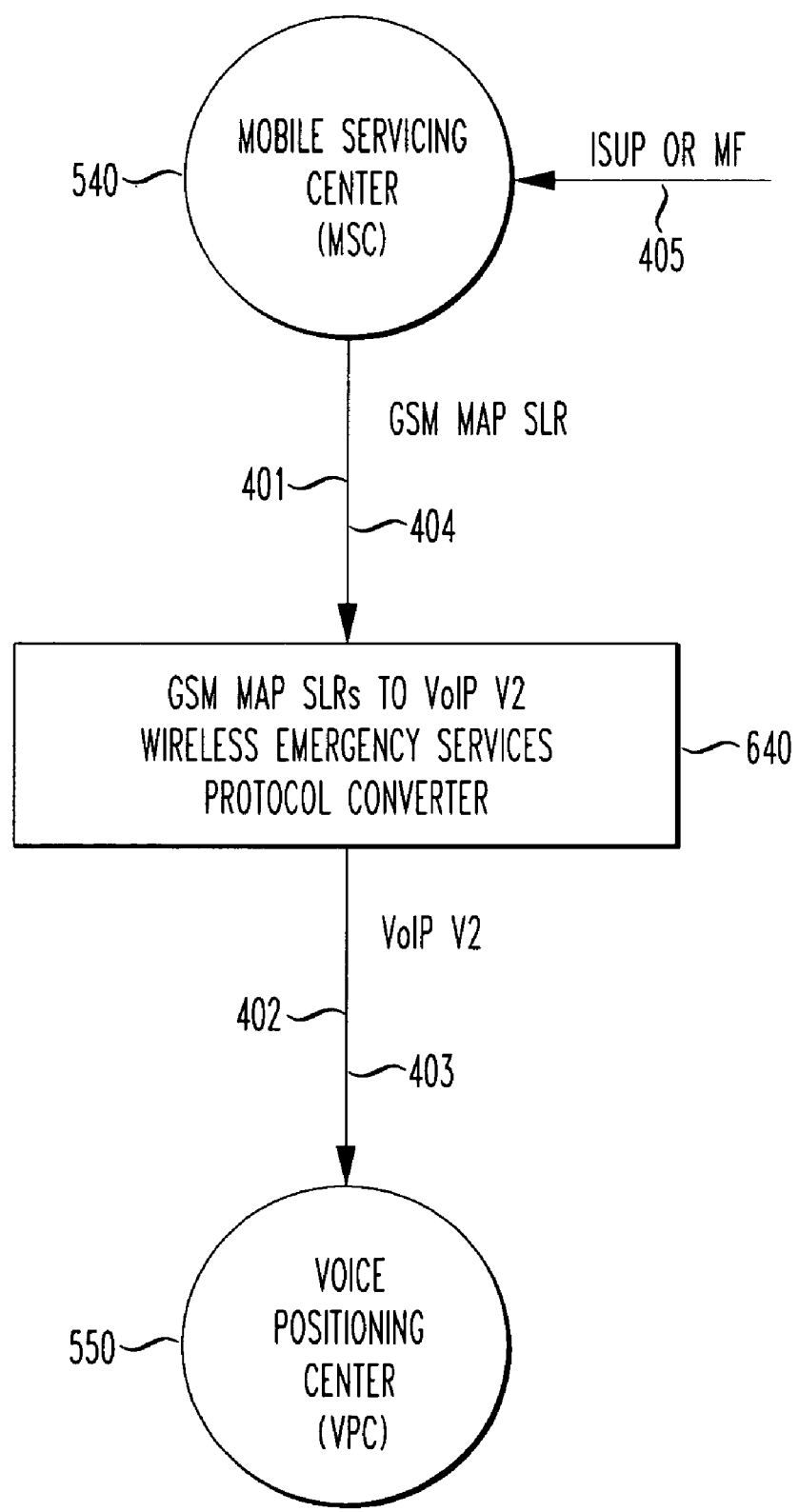
FIG. 4 shows conversion of wireless emergency call set up to Voice Over Internet Protocol (VoIP) emergency call set up, with GSM MAP SLRs converted to VoIP V2s, in accordance with the principles of the present invention.

FIG. 4 shows conversion of wireless emergency call set up to Voice Over Internet Protocol (VoIP) emergency call set up, with GSM MAP SLRs converted to VoIP V2s, in accordance with the principles of the present invention.

In particular, as shown in FIG. 4, emergency services protocols are translated back from those of a mobile servicing center (MSC) 540 to those of a Voice Positioning Center (VPC) 550, by a GSM MAP SLRs to VoIP V2 Wireless Emergency Services Protocol Converter 640.

The GSM MAP SLRs to VoIP V2 Wireless Emergency Services Protocol Converter 640 functions as follows:

In step 401 of FIG. 4, for GSM MAP signaling, the GSM MAP SLR sent by the Mobile Servicing Center (MSC) 540 preferably contains the call back number (CBN) and the Emergency Services Routing Digits (ESRD).

In step 402, the GSM MAP SLRs to VoIP V2 Wireless Emergency Services Protocol Converter 640 receives an SLR request with the call back number (CBN) and Emergency Services Routing Digits (ESRD), converts it to a VoIP V2 request, and sends the VoIP V2 request to the Voice Positioning Center (VPC) 550.

In step 403, the Voice Positioning Center (VPC) 550 is configured to return an Emergency Service Query Key (ESQK) and Emergency Service Routing Number (ESRN).

In step 404, the GSM MAP SLRs to VoIP V2 Wireless Emergency Services Protocol Converter 640 receives a VoIP V2 request and converts it to an SLR with the na-ESRK with the Emergency Service Query Key (ESQK) and the last 7-digits of the Emergency Service Routing Number (ESRN).

Note that the na-ERSK field contains a maximum of 18 digits. In the preferred embodiment, the numbering plan area (NPA) of the Emergency Service Routing Number (ESRN) is preferably always the same as the numbering plan area (NPA) of the Emergency Service Query Key (ESQK).

In step 405, the Mobile Servicing Center (MSC) 540 receives the SLR and sets up the call appropriately over ISUP or Multi-Frequency (MF) signaling.

Benefits of the invention include that operators of Gateway Mobile Location Centers (GMLCs) or Mobile Positioning Centers (MPCs) who implement VoIP offerings can re-use their existing GMLC or MPC to service VoIP 9-1-1 calls. Moreover, operators of Voice Positioning Centers (VPCs) who implement wireless offerings can re-use their existing VPCs to service wireless 9-1-1 calls.

The invention allows interaction of VSPs with a Mobile Positioning Center (MPC) or Gateway Mobile Location Center (GMLC), and/or interaction of wireless carriers with a Voice Positioning Center (VPC). Those that will find particular use of the invention include wireless carriers, VoIP service providers, and especially those who already own an MPC, GMLC, or VPC and want to provide both wireless and VoIP telecommunications.

While the invention has been described with reference to the exemplary embodiments thereof, those skilled in the art will be able to make various modifications to the described embodiments of the invention without departing from the true spirit and scope of the invention.

What is claimed is:

1. Apparatus to translate emergency services protocol call setup information from VoIP to GSM MAP SLR, comprising:
a receiver to receive, from a Voice Service Provider (VSP), VoIP signaling;
a CBN inserter to insert a call back number (CBN) into at least one of an International Mobile Subscriber Identity (IMSI) field and an na-ESRD field of a GSM MAP SLR; and
an ESRK inserter to insert an emergency service routing key (ESRK) into a VoIP message;
whereby said VoIP message permits, with said ESRK, setup of an emergency services call with Session Initiation Protocol (SIP).

2. The apparatus to translate emergency services protocol call setup information from VoIP to GSM MAP SLR according to claim 1, wherein: said received call back number (CBN) is treated as emergency services routing digits (ESRD), permitting said ESRD to determine an ESRK based on a subscribers provisioned address.

3. The apparatus to translate emergency services protocol call setup information from VoIP to GSM MAP SLR according to claim 2, wherein: said received mobile directory number (MDN) is treated as emergency services routing digits (ESRD), and permits said ESRD to determine digits to select, based on said subscribers provisioned address, at least one of a proper selective router and a proper trunk group.

4. The apparatus to translate emergency services protocol call setup information from VoIP to GSM MAP SLR according to claim 1, wherein: said insertion of said CBN sets an na-ESRK flag.

5. A method to translate emergency services protocol call setup information from VoIP to GSM MAP SLR, comprising:
- receiving, from a Voice Service Provider (VSP), VoIP signaling;
- inserting a call back number (CBN) into at least one of an International Mobile Subscriber Identity (IMSI) field and an na-ESRD field of a GSM MAP SLR; and
- inserting an emergency service routing key (ESRK) into a VoIP message;
- whereby said VoIP message permits, using said ESRK, setup of an emergency services call over Session Initiation Protocol (SIP).

6. The method to translate emergency services protocol call setup information from VoIP to GSM MAP SLR according to claim 5, further comprising:
- permitting said ESRD to determine an ESRK based on a subscribers provisioned address.

7. The method to translate emergency services protocol call setup information from VoIP to GSM MAP SLR according to claim 5, further comprising:
- permitting said ESRD to select, based on said subscribers provisioned address, at least one of a proper selective router and a proper trunk group.

8. The method to translate emergency services protocol call setup information from VoIP to GSM MAP SLR according to claim 5, wherein: setting an na-ESRK flag.

* * * * *